United States Patent [19]
Weisgerber

[11] 3,921,178
[45] Nov. 18, 1975

[54] TIME UTILIZATION MONITOR

[76] Inventor: Charles F. Weisgerber, P.O. Box 1489, Wickenburg, Ariz. 85358

[22] Filed: Feb. 11, 1974

[21] Appl. No.: 441,014

[52] U.S. Cl. .................... 346/14; 346/50; 346/79; 346/138
[51] Int. Cl.² .......................................... G01D 9/30
[58] Field of Search ........... 346/138, 132, 126, 103, 346/50, 79, 80, 14; 58/145 R

[56] References Cited
UNITED STATES PATENTS

| | | | |
|---|---|---|---|
| 807,708 | 12/1905 | Ammann et al. | 346/50 |
| 1,309,235 | 7/1919 | Auram | 346/14 R |
| 1,505,198 | 8/1924 | Hough | 58/145 R |
| 2,554,981 | 5/1951 | Goff | 346/138 X |
| 3,429,121 | 2/1969 | Parker | 58/145 R |

Primary Examiner—Joseph W. Hartary

[57] ABSTRACT

An electro-mechanical monitor provides means by which information is impressed as condensed indicia upon a record and accummulated in a readout, and all of which is associated with the operation of equipment, whereby effective or ineffective time and quantity information is made permanent and immediately available on a practical basis. A timer is continuously operated to motivate an information recording scanner and a digital information accummulator and to intermittently trigger the information recording scanner for permanent graphic recordation. One or more and preferably a multiplicity of operational sources are simultaneously processed and associated on a common time basis, whereby effective operation of equipment is presented graphically as related to specific increments of time and accummulated as a percentage of the predetermined or potential time.

17 Claims, 2 Drawing Figures

TIME UTILIZATION MONITOR

BACKGROUND

This invention relates to the "time utilization" of equipment such as factory machines, whether operated by personnel or automated, and is concerned with a monitor for recording information concerning equipment potential or "time utilization." To this end, I have provided a comparatively inexpensive, high reliability monitoring device, having a low operating and maintenance cost, and capable of providing the desired significant and meaningful data.

Machines and devices that we are concerned with and which require monitoring, generally require the attendance of and/or manipulation by a qualified operator. For example, the operator being governed by custom and established work rules, is in attendance for a "shift" which may vary in elapsed time as well as in effective productive time. For instance, a nominal eight hour shift may consist of a total elapsed time of more than 9 hours, when there is a 1 hour "lunch" period. Additionally, there may be "coffee breaks" during each portion of the shift, and also "personal comfort" time. Furthermore, "start up" and/or "shut down" or "clean up" time is to be considered; and the net result is a total ineffective time which may be in excess of several hours, and an effective time of 6 or 7 hours more or less. It is a general object therefore, to provide a means for the determination of the "time utilization" of energy absorption, dissipation, conversion, transmitting or transforming equipment.

The following are applicable definitions for the terminology employed herein:

"Time utilization" is the actual or effective time divided by the potential time which produces a decimal factor that when multiplied by 100 results in a percentage of the potential time.

"Predetermined time" is that time, expressed in hours and fractional parts thereof, or such other time units as determined by a supervisor of the machine or device and which represents the maximum effective time which is available for meeting the requirement of a predetermined state or condition, without reference to the elapsed time.

"Potential time" is numerically the same as predetermined time.

"Predetermined state or condition" is that state or condition which meets a minimum requirement set by the supervisor of the monitored equipment or device.

"Effective time" is that portion of the potential time during which the monitored machine or device meets the requirements of the predetermined state or condition.

An object of this invention is to record in a minimum of space and to closely display related information from at least one operational source, as related to incremental periods of time and for the purpose of monitoring effective time, or alternately ineffective time. With the present invention, a multiplicity of graphic recordings and digital readout displays are processed simultaneously and associated on a time utilization basis.

Another object of this invention is to provide a condensed record from at least one or a multiplicity of operational sources, both a permanent graphic record and a visual digital readout, and the graphic form on a planar sheet, disc, or cylinder surface as may be desired. With the present invention, a multiplicity of recordings and displays are associated on a time and quantity basis and permanent information accumulated as required.

It is still another object of this invention to provide a scanning means by means one or more inditers are motivated to impress a permanent time-data record and/or by which one or more recorders are motivated to accumulate time-data information. With the present invention, mechanical motion is utilized to motivate the aforementioned recording means and readout means, it being an object to utilize a clock drive means for both timing and mechanical motivation.

It is also an object of this invention to provide a drive means by which coordinated scanning is effected. With the present invention there is an intermittent drive means that operates from a continuously operating clock motor, thereby establishing a time based mechanical operation that is subsequently employed for the aforementioned graphic and readout objectives.

Still another object of this invention is to provide electronic means associated with intermittently effective record means to store operational information from any desired source, to be periodically discharged for graphic recording. With the present invention, the mechanical drive that operates on a time base is employed to synchronously trigger the information stored by said electronic means to be impressed as a graphic recording.

A further object of this invention is to provide a resetable integrating readout device responsive to accumulate information having to do with energy absorption, dissipation, conversion, transmission or transforming, and the like; all as related to a predetermined state or condition. A high resolution graphic representation of effective incremental time is provided, and an immediate cumulative readout as well. Facility is provided for altering the value of the predetermined time base. And, means is provided whereby a signal source may be relatively remote and of low voltage and high impedance, for safety and thereby eliminating the chance of electrical shock or sparks that could cause fire.

DRAWINGS

The various objects and features of my invention will be fully understood from the following detailed description thereof, throughout which description reference is made to the accompanying drawings, in which.

SUMMARY OF THE INVENTION

Figure 1:
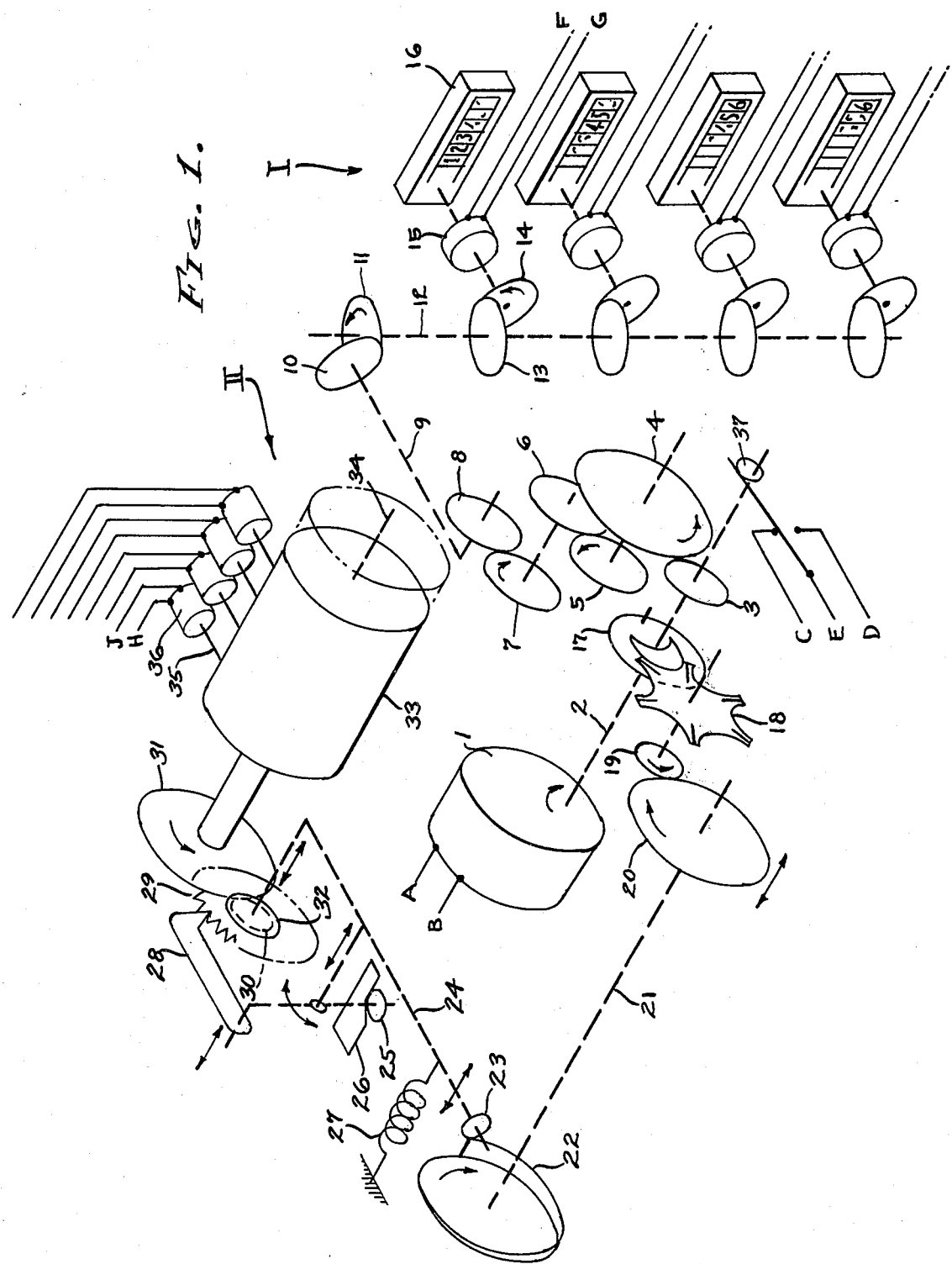
FIG. 1 is a diagrammatic and perspective view of a typical mechanical embodiment of the present invention.

Referring now to the drawings, the mechanical embodiment and coordinated features thereof are shown in FIG. 1 wherein a synchronous timepiece or drive motor 1 continuously operates a Geneva movement 17–18 through an output shaft 2. The output shaft 2 drives a visual digital readout or register means I through a gear train 3–14, and drives a graphic recording means II through a gear train 19–21 that operates a cam 22 and follower 23 to axially oscillate a recording drum 33 that is sequentially rotated incrementally by a ratchet mechanism 25–29 for scanning motion relative to one or more inditers 35–36.

Figure 2:
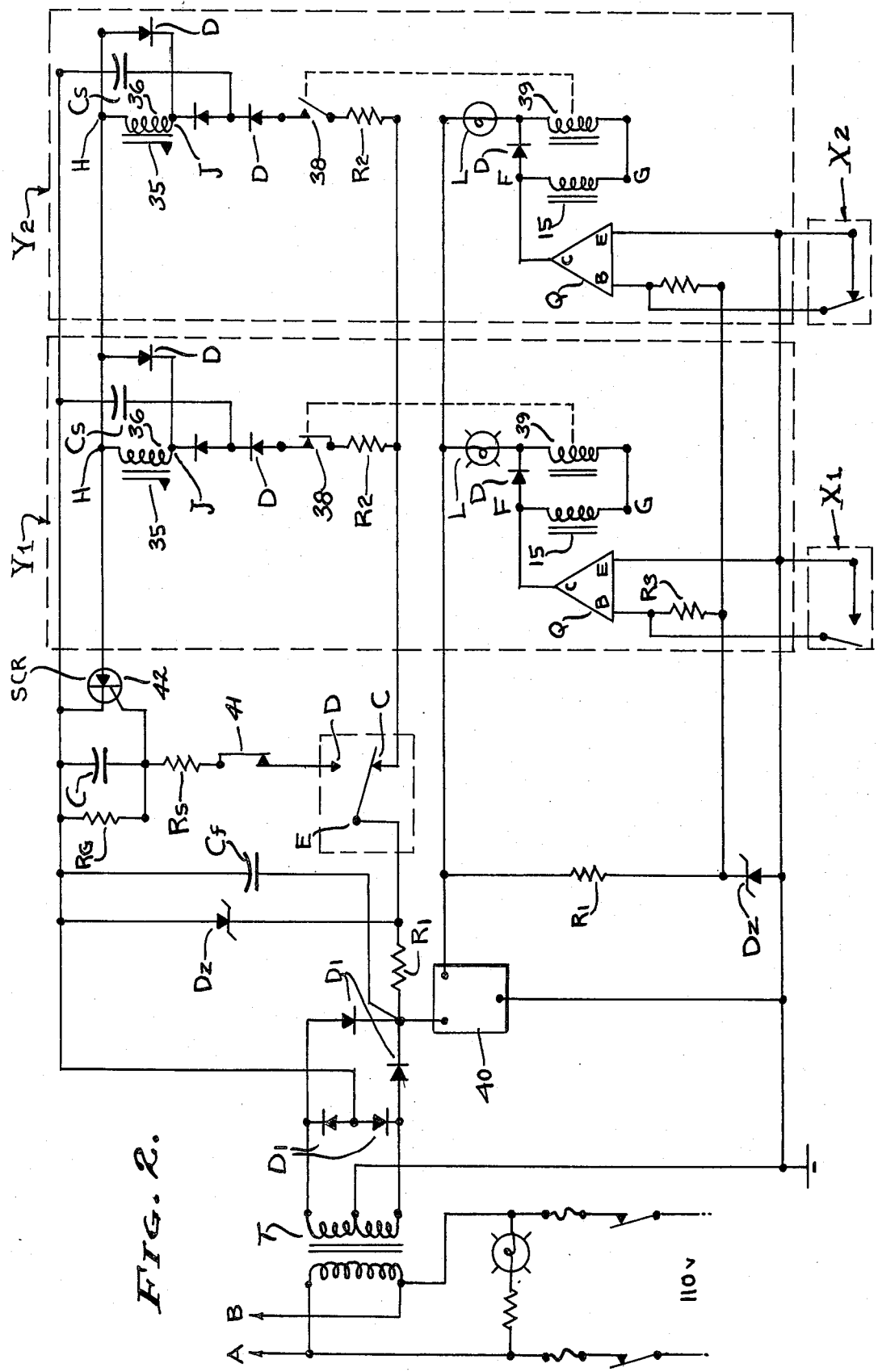
FIG. 2 is a diagrammatic representation of the electrical circuit that is coordinated with the mechanics as shown in FIG. 1.

Referring to FIG. 2 of the drawings, the electronic circuit is divided into a control section responsive to remote sensors X1, X2, etc., and adapted to operate couplings 15 for actuation of the cumulative readouts 16; and an information storage section responsive to said control section to cause storage of information in one or more capacitors Cs, thereafter to be discharged by closure of timer switch C E D periodically operated by the aforementioned mechanism of FIG. 1. Discharge of capacitor Cs impresses a recording (when previously charged) each time the record drum 33 presents a fresh surface to be scanned by the inditers 35–36.

PREFERRED EMBODIMENT

For descriptive purposes the drawing is divided into two sections, the register means I section consisting of parts 1 through 14 to motivate at least one and preferably a multiplicity of readout devices 16 through electro-mechanical clutches 15 or the like; and the graphic recording means II consisting of parts 17 through 37 responsive to motivation to impress at least one and preferably a multiplicity of records from individual electronically activated inditers. The drive motor 1 and its output shaft 2 are common to both means I and II, and they function dependently to drive both means.

Terminals A and B supply electrical power to the synchronous timing motor 1. The output shaft 2 of the timing motor drives a gear train consisting of gears, 3, 4, 5, 6, 7 and 8. Pinion gear 3 operates driving gear 4 which turns a pinion gear 5 which acts as a sun gear for planet gear 6. The planet gear 6 with the pinion gear 7 operated thereby, is rotatably partially around the sun gear 5 and thereby permits manual disengagement of gear 7 from change gear 8 with which it is normally engaged and which may be a "pick off" gear or a "cluster gear" that can be selected for its number of teeth for rapid change of the "predetermined" time base period. Gear 8 drives shaft 9 to which is attached gears 10 driving gear 11 and counter shaft 12 to which are attached gears 13 which act as drives for gears 14. The gears 14 are continuously driven by synchronous timer motor 1, at a rate determined by motor revolvement per unit of time and by transmission through gears 3–7 and selection of gear 8.

In accordance with this invention, I provide an electro-magnetic clutch or coupling 15 to be driven by each gear 14, which when energized are each capable of driveably operating an integrating readout device 16. F and G are electrical terminals for electrically energizing each coupling 15. As shown, there is at least one and preferably a plurality of readout devices 16 and each operable through its individually operable coupling 15.

The graphic means II is intermittently motivated for instance on a fractional minute, hour or other time cycle base, by a Geneva movement having a single tooth pinion gear 17 on the timing motor shaft 2 intermittently driving a Geneva gear 18 which operates a pinion gear 19 engaged with the reducer gear 20 which is slideably splined to a shaft 21 allowing gear 20 to be disengaged from pinion gear 19 for resetting a cam 22 to the start position of the drive when required. Pinion gear 19 moves a part turn intermittently, as driven by Geneva movement 17–18 and transmits a similar intermittent characteristic to the following engaged moving portions of the drive 20–22 train and ratchet mechanism 25–29.

A cam follower 23 is attached to a moveable carriage 24, which is held in contact with the ramp of cam 22 by a compression or tension spring 27, or by other appropriate means. A cam 26 and follower 25 on carriage 24 provides a means of actuating a pawl 28 which intermittently advances a ratchet wheel 29, which via gears 30 and 31 rotates roll or drum 33 on which there is supported a graphic recording medium (integral or attached). The drum 33 is slideably mounted on shaft 34 to reciprocate with the carriage 24 for scanning and is ratcheted through a specific angle of rotation so as to periodically present a fresh area of recording medium to be scanned by the inditer or inditers 35. A slideable drive disc 32 attached to gear 30 provides in conjunction with gear 31 and ratchet 29 a means of transferring the reciprocating motion of carriage 24 while permitting the increments of rotation to the roll or drum 33.

The inditers 35 are normally juxtapositioned to the surface of the graphic recording and are brought into momentary contact with the recording medium when activated, so as to leave marks or impressions thereon, at such times as when the single pole double throw switch C E D is in the E D position which triggers the gate of the S C R and which allows discharge of all charged storage capacitors Cs through their corresponding electromagnetic actuators 36 via terminals H J—see FIG. 2.

The integrating period for graphic representation is determined by the timed discharge of the storage capacitors Cs and frequency of operation of the single pole double throw timing switch C E D in conjunction with the R-C value of integrating storage capacitor system. A triggering cam 37 having one or more lobes operates the single pole double throw switch C E D and is so oriented with respect to the single tooth gear 17 that C E D is not in the E D position at any time during which the single tooth is engaged within the Geneva gear 19. In other words, the E C position is maintained during dwell and all other periods of the Geneva movement.

Referring now to FIG. 2, T is an energized step-down transformer with a center tap on the secondary winding. Diodes D1 are rectifiers and as illustrated are arranged in a bridge configuration to power the circuitry. This arrangement permits an economical means of providing, in conjunction with the grounded center tap of the transformer secondary, two different direct current voltages, one grounded and one floating. The current requirements of the floating voltage can be a very small fraction of the grounded circuit current, thus permitting the use of low capacity diodes.

In accordance with this invention, there is at least one and preferably a multiplicity of sensor and trigger responsive channels Y1, Y2, etc., and each responsive to a distant sensor X1, X2, etc., respectively. As shown, all channels Y1 and Y2, etc., are responsive to the trigger switch E D C, and each channel comprises an amplifying circuit that responds to a normally closed sensor switch which when opened operates the coupling 15 and a relay 39 of an information storage circuit for charging of capacitor Cs, in each instance. The floating current voltage powers the last mentioned storage circuit through the E C position, and in the alternative E D position there is no power in the E C line.

Diodes D are blocking diodes while Dz are voltage regulator diodes. Capacitors Cs are the storage capacitors, capacitors Cf are filter capacitors, and capacitor C is a transient suppressor capacitor. Single pole double throw switch D E C is shown in the normal E C position permitting potential charging of capacitors Cs. R1 is a voltage dropping resistor serving the Zener diodes Dz, while R2 and R3 are current limiting resistors. Q are current amplifiers, preferably high gain, of the Darlington configuration in which C is the collector, E is the grounded emitter and B is the base.

X1, X2, etc., represent remote sensors, which as illustrated may be simple single pole single throw normally closed switches or contacts, or there may be a number of contacts in series or in parallel as may be required by the condition to be sensed. The X1 illustration of FIG. 2 represents the situation when the normally closed contact at the monitored device or station is opened and meets the minimum requirement to satisfy the predetermined state or condition. The result of opening the normally closed contact is to allow the current normally flowing through R3 to ground, and to divert to "B" the base of amplifier "Q" thereby activating Q to saturation and thereby presenting a low series impedence to the load which may consist of coupling 15, relay coil 39, and L, preferably in series, as shown, or an equivalent parallel circuit. The resulting load current activates the electromagnetic means 15 thereby engaging the register 16. In addition, the coil of electromagnetic relay 39 and also pilot lamp L, preferably incandescent, which may act as a visual indicator of the status of the monitored equipment are activated. Blocking diode D is a protective circuit element involved with current reversal in the circuitry shown. Lamp L is normally operated at 60–70% of its rating and is of low resistance when its filament is cold and of high resistance when its filament is hot, and acts as a ballast allowing fast operation of the electromechanical coupling 15 and relay coil 39. The inductance of the magnetic circuits involved limits high current surges in the lamp filament, thus greatly prolonging the life of the lamp L.

The electrical contacts 28 of relay 39 are closed by opening of the sensor switches X1, X2, etc., as indicated, allowing capacitor Cs to charge from the floating current supply through resistor R2. The electrical charge on Cs is directed by diodes D. The electrical potential of terminals H and J builds up to that of the capacitors Cs having the highest potential, with the cathode terminal of S C R acting as the reference point. 42 is a Silicon Controlled Rectifier. Rs is a resistor in series with Rg, the gate resistor for the S C R. 40 is a suitable voltage regulator for the grounded circuit. 41 is a disable switch which may be manual or automatic as desired.

The X2 illustration of FIG. 2 represents the situation when the monitored station is closed and the equipment does not satisfy the requirement for the predetermined state or condition. In this situation the base of amplifier Q is in effective contact with its emmiter E, thereby blocking the current flow therethrough.

The input power (110V) is reduced to lower voltages, rectified, and isolated into a low voltage control section and a higher voltage information storage section. The control section of the circuitry is characterized by signal sensitive amplifiers Q of high gain which are responsive to opening of the sensor switches, and which are operated through current limiting resistors. It is the primary function of the control section to simultaneously energize the electromechanical clutch 15 of the readout section I and the time information storage circuit that governs the graphic recording section II. The floating circuit (not grounded) preferably of a higher regulated voltage, includes the time information storage capacitors therein and is responsive to sensor switch X1, X2, etc., charging said capacitors through trigger switch contacts E C. When the S C R gate circuit is energized (the E D position) the capacitors Cs, are discharged through their respective inditer coils 36, thereby depressing the enditers for a time interval, at most a few milliseconds commensurate with the charge from their related capacitors respectively.

From the foregoing it will be seen that a practical electromechanical time utilization monitor is provided for the permanent storage and immediate availability of conditional information. Mechanical motivation is obtained from a timepiece in the form of a synchronous motor 1 or the like, and this motor runs continuously to axially oscillate and intermittently advance the drum 33 for receiving sequential scan lines from one or more inditers 35. The intermittent drive is shown as a Geneva movement having a dwell period during which recordation is performed and a dwell period during which storage of information is performed. In practice, the cylinder surface of drum 33 acts as a support for the recording paper which is wrapped from a sheet or continuous strip (roll) or the like. The inditers 35 are pen-like writing instruments, and to the end that all preceding recorded incremental time data is immediately discernable as a permanent record.

The readouts 16 can vary in form, and in carrying out the invention present digital values for instantaneous observations; the cluster gear is shiftable for selective ratio of the motivation to the readout section I and the gear 20 if shiftable for disengagement of the motivating power to the graphic recording section II. In accordance with the invention, a timed Geneva cycle is established by the motor 1 and with the cam 37 as shown related thereto so as to open trigger switch contacts E C during the dwell of the Geneva movement (position as shown in FIG. 1), and subsequently to close switch contacts E D during the same dwell period thereof. As is hereinabove described, the capacitors Cs are charged from the floating power circuit when the sensors X1, X2, etc., are opened; while the couplings 15 are activated to motivate the digital readouts 16 from the continuously operated gear train 3–14. The E D position of the trigger switch causes discharge of the capacitors Cs through their respective drive coils 36, thereby depressing the corresponding inditer to make recordings during the dwell period of the drum 33. It will be observed that the process is synchronously and continuously operated on the time cycle base set by the drive motor 1.

Having described only a typical preferred form and application of my invention, I do not wish to be limited or restricted to the specific details herein set forth, but wish to reserve to myself any modifications or variations that may appear to those skilled in the art.

Having described my invention, I claim:

1. A time utilization monitor including; a continuously operating timer motor drive, an intermittent motion means operated by the drive and having a dwell period and a motivating period, a laterally shiftable and longitudinally advancive record member, oscillating means responsive to the intermittent motion means during said motivating period and laterally reciprocating said record member, advance means responsive to said reciprocation and incrementally advancing said record member longitudinally, at least one inditer means responsive to a condition sensor and activated thereby to mark the said record member during said lateral reciprocation thereof.

2. The time utilization monitor as set forth in claim 1, wherein the intermittent motion means is a Geneva movement having positive dwell and motivating periods.

3. The time utilization monitor as set forth in claim 1, wherein the record member has a columnar surface and each column aligned with an inditer to mark a record thereon.

4. The time utilization monitor as set forth in claim 1, wherein the record member is an axially shiftable drum reciprocated by said oscillating means and incrementally rotated by said advance means.

5. The time utilization monitor as set forth in claim 1, wherein the oscillating means comprises a cam powered by the drive during said motivating period, and a follower reciprocating a carrier support for the record member.

6. The time utilization monitor as set forth in claim 1, wherein the oscillating means comprises a cam powered by the drive during said motivating period, and a follower reciprocating a carrier support for the record member, and wherein the advance means comprises a cam and follower responsive to reciprocation of the said carriage to incrementally advance the record member.

7. The time utilization monitor as set forth in claim 1, wherein the oscillating means comprises a cam powered by the drive during said motivating period, and a follower reciprocating a carrier support for the record member, and wherein the advance means comprises a cam follower responsive to reciprocation of the said carriage mechanism to incrementally advance the record member.

8. The time utilization monitor as set forth in claim 1, wherein the continuously operating timer motor drive actuates a trigger switch during said dwell period and depression of the inditer being controlled by means responsive thereto to mark the record member.

9. A time utilization monitor including; a continuously operating timer motor drive, a condition sensor, an advancive readout means, a normally disengaged coupling means advancibly coupling the readout means to the motor drive, and means responsive to the condition sensor and activated thereby to engage the coupling means to advance the readout means, an intermittent motion means operated by the drive and having a dwell period and a motivating period, a laterally shiftable and longitudinally advancive record member, oscillating means responsive to the intermittent motion means during said motivating period, and laterally reciprocating said record member, advance means responsive to said reciprocation and incrementally advancing said record member longitudinally, and at least one inditer means responsive to the condition sensor and activated thereby to mark the said record member during the swell period and said lateral reciprocation thereof.

10. The time utilization monitor as set forth in claim 9, wherein the motion means is a Geneva movement having a continuously moving member driving the moving member driving the inditer record member.

11. A time utilization monitor including an intermittent motion means operated by a continuously operating timer motor drive and having a dwell period and a motivating period, means comprising a sensor switch closed to a chargeable electric capacitance circuit during said dwell period, a laterally shiftable and longitudinally advancive record, oscillating means responsive to the intermittent motion means during said motivating period and laterally reciprocating said record member, advance means responsive to said reciprocation and incrementally advancing said record member longitudinally, and a triggering switch responsive to said timer motor drive for discharging said capacitance circuit during said dwell period to activate inditer means to mark said record member commensurate with the previously charged capacitance.

12. The time utilization monitor as set forth in claim 11, wherein the sensor switch is in a low voltage high impedance control circuit.

13. The time utilization monitor as set forth in claim 11, wherein the capacitance circuit is a floating circuit isolated from the sensor switch circuit.

14. The time utilization monitor as set forth in claim 11, wherein the sensor switch is in a low voltage high impedance control circuit responsively closing the capacitance circuit through relay means.

15. The time utilization monitor as set forth in claim 11, wherein the sensor switch is in a low voltage high impedance control circuit responsively closing the capacitance circuit through relay means, and wherein the capacitance circuit is a floating circuit isolated from the sensor switch circuit and intermittently discharged by said triggering switch.

16. The time utilization monitor as set forth in claim 11, wherein the sensor switch is in a low voltage high impedance control circuit responsively closing the capacitance circuit through relay means, and wherein the capacitance circuit is a floating circuit isolated from the sensor switch circuit and intermittently discharged by electronic switch means controlled by said triggering switch.

17. The time utilization monitor as set forth in claim 11, wherein the sensor switch is in a low voltage high impedance control circuit with a high gain amplifier to operate the responsive record means.

* * * * *